(12) United States Patent
Kachi et al.

(10) Patent No.: US 10,965,486 B2
(45) Date of Patent: Mar. 30, 2021

(54) HOME ELECTRICAL APPLIANCE MANAGEMENT SYSTEM, OUTLET PLUG, HOME ELECTRICAL APPLIANCE, AND CONTROL TERMINAL

(71) Applicant: Panasonic Intellectual Property Management Co., Ltd., Osaka (JP)

(72) Inventors: Masamichi Kachi, Aichi (JP); Kazuki Doumoto, Aichi (JP); Tsuraki Nakajima, Aichi (JP); Ayumi Konishi, Aichi (JP); Masato Suzuki, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/344,444

(22) PCT Filed: Nov. 28, 2017

(86) PCT No.: PCT/JP2017/042485
§ 371 (c)(1),
(2) Date: Apr. 24, 2019

(87) PCT Pub. No.: WO2018/101225
PCT Pub. Date: Jun. 7, 2018

(65) Prior Publication Data
US 2019/0323721 A1    Oct. 24, 2019

(30) Foreign Application Priority Data

Nov. 30, 2016 (JP) .............. JP2016-232609
Mar. 31, 2017 (JP) .............. JP2017-069637

(51) Int. Cl.
*H04L 12/28* (2006.01)
*G06F 1/3203* (2019.01)
*G06F 13/00* (2006.01)

(52) U.S. Cl.
CPC ........ *H04L 12/2823* (2013.01); *G06F 1/3203* (2013.01); *G06F 13/00* (2013.01); *H02J 2310/14* (2020.01)

(58) Field of Classification Search
CPC ......... F24F 11/54; F24F 11/62; G06F 1/3203; G06F 13/00; H04Q 9/00; H02J 2310/14;
(Continued)

(56) References Cited

U.S. PATENT DOCUMENTS

2003/0045170 A1* 3/2003 Ohkawa .............. H01R 31/065
                                                        439/638
2003/0169156 A1* 9/2003 Perret .................. H04L 69/329
                                                        340/3.5
(Continued)

FOREIGN PATENT DOCUMENTS

JP    2003-339086 A    11/2003
JP    2015-148410 A    8/2015

OTHER PUBLICATIONS

International Search Report for corresponding Application No. PCT/JP2017/042485, dated Feb. 13, 2018.

*Primary Examiner* — Christopher E. Everett
(74) *Attorney, Agent, or Firm* — Renner, Otto, Boisselle & Sklar, LLP

(57) ABSTRACT

A home appliance management system includes an outlet plug, a home appliance, and a control terminal. The outlet plug includes a position information storage which stores position information and a position information transmitting unit. The home appliance includes a position information receiving unit, a function providing unit, a type information storage, and a position and type information transmitting unit. The control terminal includes a position and type
(Continued)

information receiving unit, a position and type information storage, an operating condition determining unit, and an operation controller.

11 Claims, 13 Drawing Sheets

(58) Field of Classification Search
CPC .......................... G08C 2201/50; G08C 17/02; G08C 2201/40; G08C 2201/91
See application file for complete search history.

(56) References Cited

U.S. PATENT DOCUMENTS

| | | | | |
|---|---|---|---|---|
| 2007/0043478 | A1* | 2/2007 | Ehlers | ...................... F24F 11/30 700/276 |
| 2015/0205316 | A1* | 7/2015 | Choi | ........................ H02J 3/14 700/295 |

* cited by examiner

FIG. 5

| Position information | Type information |
|---|---|
| 03 | Air purifier |
| 04 | Humidifier |
| 03 | Humidifier |
| 03 | Dehumidifier |
| 03 | Ventilation fan |
| 04 | Ventilation fan |
| 02 | Ventilation fan |

60
61
62
63
64

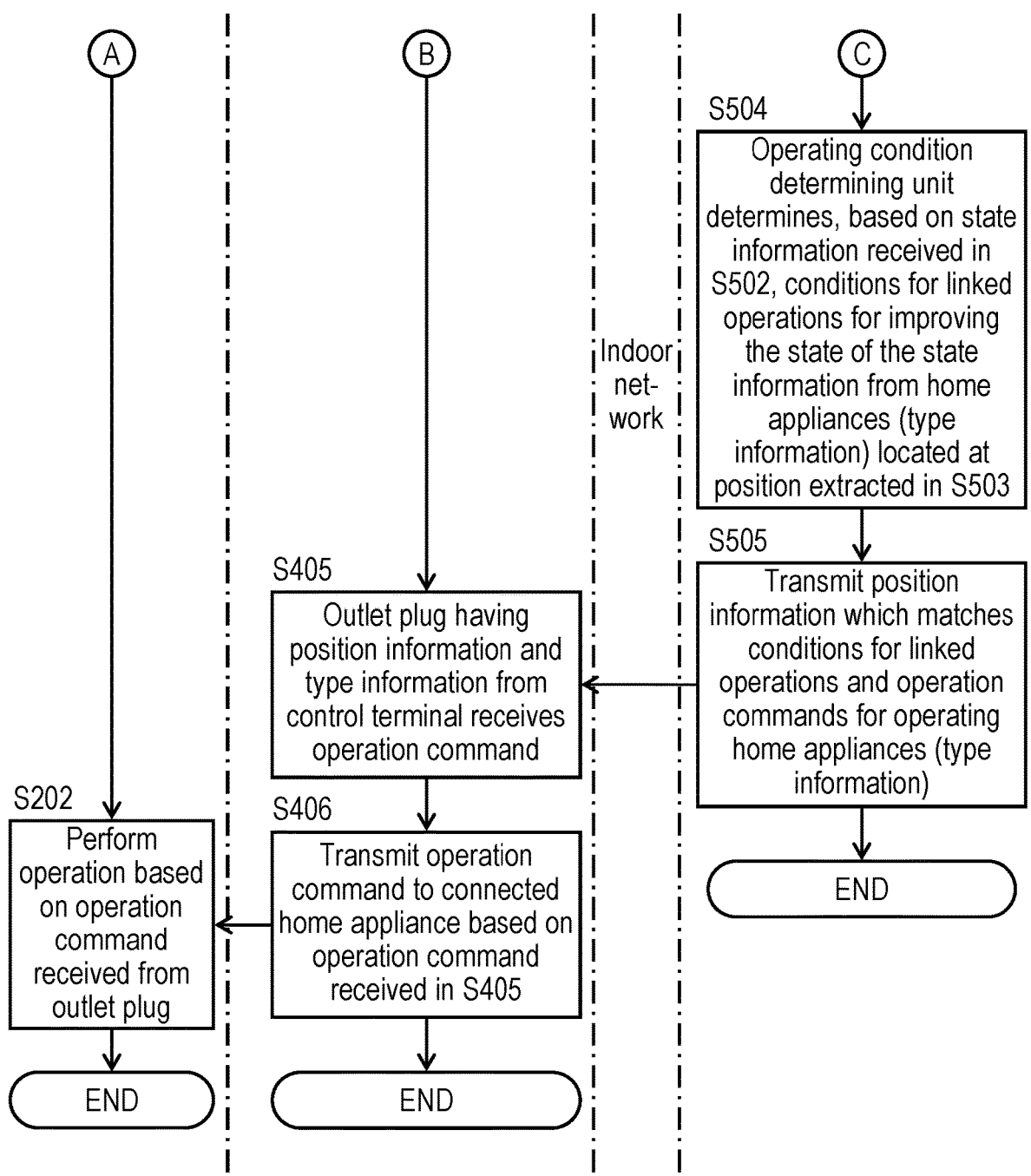

HOME ELECTRICAL APPLIANCE MANAGEMENT SYSTEM, OUTLET PLUG, HOME ELECTRICAL APPLIANCE, AND CONTROL TERMINAL

TECHNICAL FIELD

The present disclosure relates to a home appliance management system, an outlet plug, a home appliance, and a control terminal.

BACKGROUND ART

Conventionally, an air conditioning control device is known which includes an input unit, a temperature obtaining unit, an estimating unit, and a calculating unit (for example, see Patent Literature (PTL) 1). The input unit receives input of position information of the air conditioning control device in a building and the target temperature. The temperature obtaining unit obtains information of the temperature measured by the temperature measuring unit. The estimating unit estimates, based on the structural data of the building and the temperature information obtained by the temperature obtaining unit, a temporal change in temperature for each of the divided spaces obtained by dividing the space in the building. The calculating unit extracts, from the estimated result of the estimating unit, the temperature of the divided space corresponding to the position information of the air conditioning control device in the building received by the input unit, and calculates the air conditioning control amount based on the extracted temperature and the target temperature.

CITATION LIST

Patent Literature

PTL 1: Japanese Unexamined Patent Application Publication No. 2015-148410

SUMMARY OF THE INVENTION

Such an air conditioning control device receives, by the input unit, the position information of the air conditioning control device and the temperature obtaining unit provided beforehand, so that air conditioning control in the building is performed.

With this configuration, for example, the position information and home appliance type information need to be input each time an air conditioning control device which is a home appliance is added, is replaced with another home appliance, or is moved to another room.

In view of the above, the present disclosure has been conceived to solve the conventional problem described above. An object of the present disclosure is to provide a home appliance management system, an outlet plug, a home appliance, and a control terminal which do not require input of the position information and the type information of the home appliance each time the position of the home appliance is changed, or a home appliance is added or replaced.

In order to achieve the above object, a home appliance management system according to one aspect of the present disclosure includes: an outlet plug which has an IN terminal and an OUT terminal, the outlet plug receiving power supply by the IN terminal being connected to an outlet, the outlet plug supplying power via the OUT terminal; a home appliance which receives power supply from the outlet plug; and a control terminal which controls the home appliance. The outlet plug includes: a position information storage which stores position information which is information for identifying a position of the outlet plug; and position information transmitting unit which transmits, via a connection cord, the position information stored in the position information storage to the home appliance connected to the OUT terminal. The home appliance includes: a position information receiving unit which receives the position information from the outlet plug via the connection cord, the position information having been transmitted from the outlet plug; a function providing unit which provides a predetermined function, receives an operating condition transmitted from the control terminal, and executes the received operating condition; a type information storage which stores type information which indicates a type of the predetermined function provided by the function providing unit; and a position and type information transmitting unit which transmits the position information and the type information to the control terminal. The control terminal includes: a position and type information receiving unit which receives the position information and the type information from the home appliance; a position and type information storage which stores the position information in association with the type information, the position information and the type information having been received by the position and type information receiving unit; an operating condition determining unit which determines the operating condition for the home appliance, based on the position information and the type information stored in the position and type information storage; and an operation controller which transmits the operating condition determined by the operating condition determining unit to a corresponding home appliance.

An outlet plug according to one aspect of the present disclosure has an IN terminal and an OUT terminal. The outlet plug receives power supply by the IN terminal being connected to an outlet, and the outlet plug supplies power to a home appliance via the OUT terminal. The outlet plug includes: a position information storage which stores position information which is information for identifying a position of the outlet plug; and a position information transmitting unit which transmits, via a connection cord, the position information stored in the position information storage to the home appliance connected to the OUT terminal.

A home appliance according to one aspect of the present disclosure includes: a function providing unit which provides a predetermined function, receives an operating condition, and executes the received operating condition; a type information storage which stores type information which indicates a type of the predetermined function provided by the function providing unit; a position information receiving unit which receives, from an outlet plug which is connected via a connection cord, position information via the connection cord, the position information being stored in the outlet plug; and a position and type information transmitting unit which transmits the position information received by the position information receiving unit and the type information stored in the type information storage.

A control terminal according to one aspect of the present disclosure includes: a position and type information receiving unit which receives position information and type information, the position information being information for identifying a position of a home appliance, the type information indicating a type of a function provided by the home appliance; a position and type information storage which stores the position information in association with the type information, the position information and the type information having been received by the position and type information receiving unit; an operating condition determining unit which determines an operating condition for the home appliance based on the position information and the type information stored in the position and type information storage; and an operation controller which transmits the operating condition determined by the operating condition determining unit to a corresponding home appliance.

A home appliance management system according to one aspect of the present disclosure includes: an outlet plug having an IN terminal and an OUT terminal, the outlet plug receiving power supply by the IN terminal being connected to an outlet, the outlet plug supplying power via the OUT terminal; a home appliance receiving power supply from the outlet plug; and a control terminal which controls the home appliance. The home appliance includes: a function providing unit which provides a predetermined function, receives an operating condition from the outlet plug via a connection cord, and executes the received operating condition; a type information storage which stores type information which indicates a type of the predetermined function provided by the function providing unit; and a type information transmitting unit which transmits the type information to the outlet plug via the connection cord. The outlet plug includes: a position information storage which stores position information which is information for identifying a position of the outlet plug; a type information receiving unit which receives the type information via the connection cord from the type information transmitting unit in the home appliance; a position and type information transmitting unit which transmits the position information and the type information to the control terminal; and a device operation controller which receives the operating condition from the control terminal and transmits the operating condition to the function providing unit in the home appliance. The control terminal includes: a position and type information receiving unit which receives the position information and the type information from the outlet plug; a position and type information storage which stores the position information in association with the type information, the position information and the type information having been received by the position and type information receiving unit; an operating condition determining unit which determines the operating condition for the home appliance based on the position information and the type information stored in the position and type information storage; and an operation controller which transmits the operating condition determined by the operating condition determining unit to the outlet plug connected to a corresponding home appliance.

An outlet plug according to one aspect of the present disclosure has an IN terminal and an OUT terminal. The outlet plug receives power supply by the IN terminal being connected to an outlet, and the outlet plug supplies power to a home appliance via the OUT terminal. The outlet plug includes: a position information storage which stores position information which is information for identifying a position of the outlet plug; a type information receiving unit which receives type information via a connection cord from the home appliance, the type information indicating a type of a function provided by a function providing unit in the home appliance; a position and type information transmitting unit which transmits the type information and the position information to a control terminal; and a device operation controller which receives an operating condition from the control terminal and transmits the received operating condition to the function providing unit in the home appliance.

A home appliance according to one aspect of the present disclosure includes: a function providing unit which provides a predetermined function, receives an operating condition via a connection cord from an outlet plug, and executes the received operating condition; a type information storage which stores type information which indicates a type of the predetermined function provided by the function providing unit; and a type information transmitting unit which transmits the type information to the outlet plug via the connection cord.

A control terminal according to one aspect of the present disclosure includes: a position and type information receiving unit which receives position information and type information from an outlet plug, the type information being information for identifying a position of the outlet plug, the type information indicating a type of a function provided by a function providing unit in a home appliance; a position and type information storage which stores the position information in association with the type information, the position information and the type information having been received by the position and type information receiving unit; an operating condition determining unit which determines an operation of the home appliance based on the position information and the type information stored in the position and type information storage; and an operation controller which transmits the operating condition determined by the operating condition determining unit to an outlet plug connected to a corresponding home appliance.

According to the present disclosure, it is possible to provide, for example, a home appliance management system which is capable of eliminating the need for input of the position information and the type information of a home appliance each time the position of the home appliance is changed, or a home appliance is added or replaced with another home appliance.

BRIEF DESCRIPTION OF DRAWINGS

FIG. 5 illustrates an example of a relationship table between position information and type information.

FIG. 13 is a flowchart of home appliance operating processing in the home appliance management system.

DESCRIPTION OF EMBODIMENTS

Hereinafter, embodiments of the present disclosure will be described with reference to the drawings. Each of the embodiments described below shows a preferred specific example of the present disclosure. Accordingly, the numerical values, shapes, materials, structural components, arrangement and connection of the structural components, steps, the processing order of the steps, and the like described in the embodiments described below are examples, and are not intended to limit the present disclosure. Therefore, among the structural components in the embodiments described below, the structural components that are not described in independent claims defining the most generic concept of the present disclosure are described as optional structural components. Moreover, in each drawing, the same reference numbers are given to substantially the same structure, and redundant descriptions will be omitted or simplified.

Moreover, in the embodiments of the present disclosure, the term "home appliance" refers to an electrical device, electric equipment, or electric machine used mainly at home.

Embodiment 1

Figure 1:
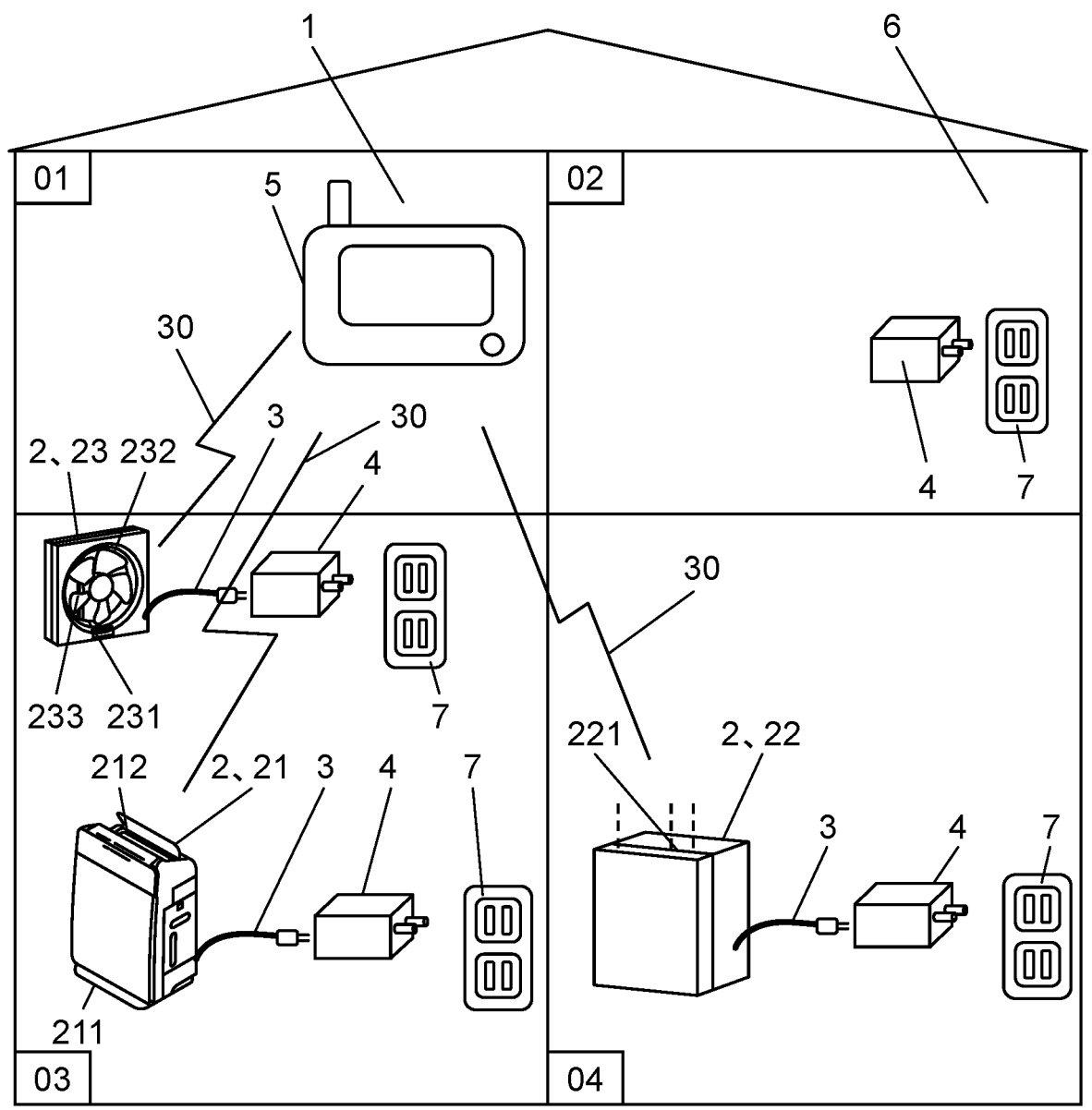
FIG. 1 is a schematic diagram of a home appliance management system according to Embodiment 1 of the present disclosure.
Figure 2:
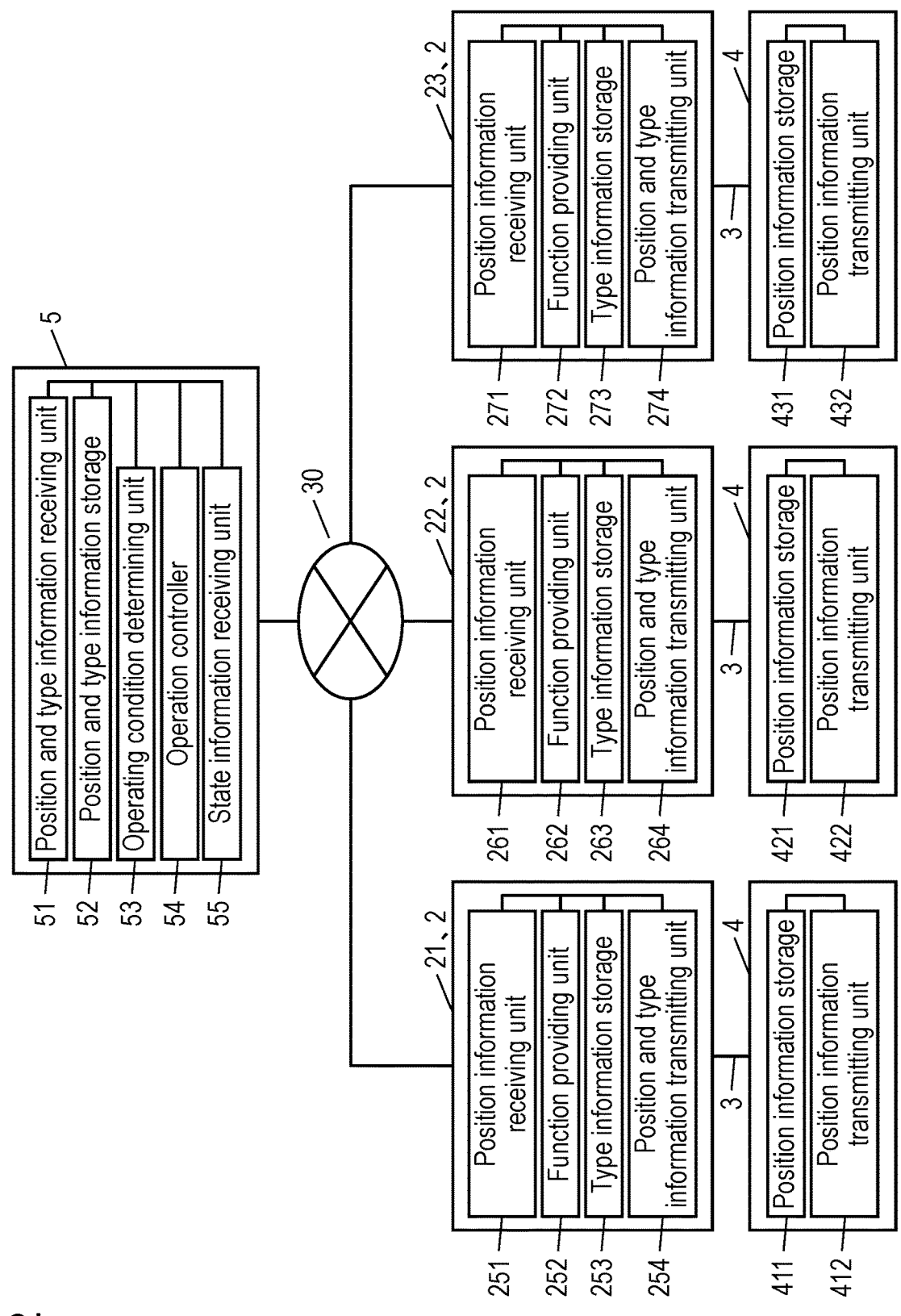
FIG. 2 is a functional block diagram of the home appliance management system.
Figure 3:
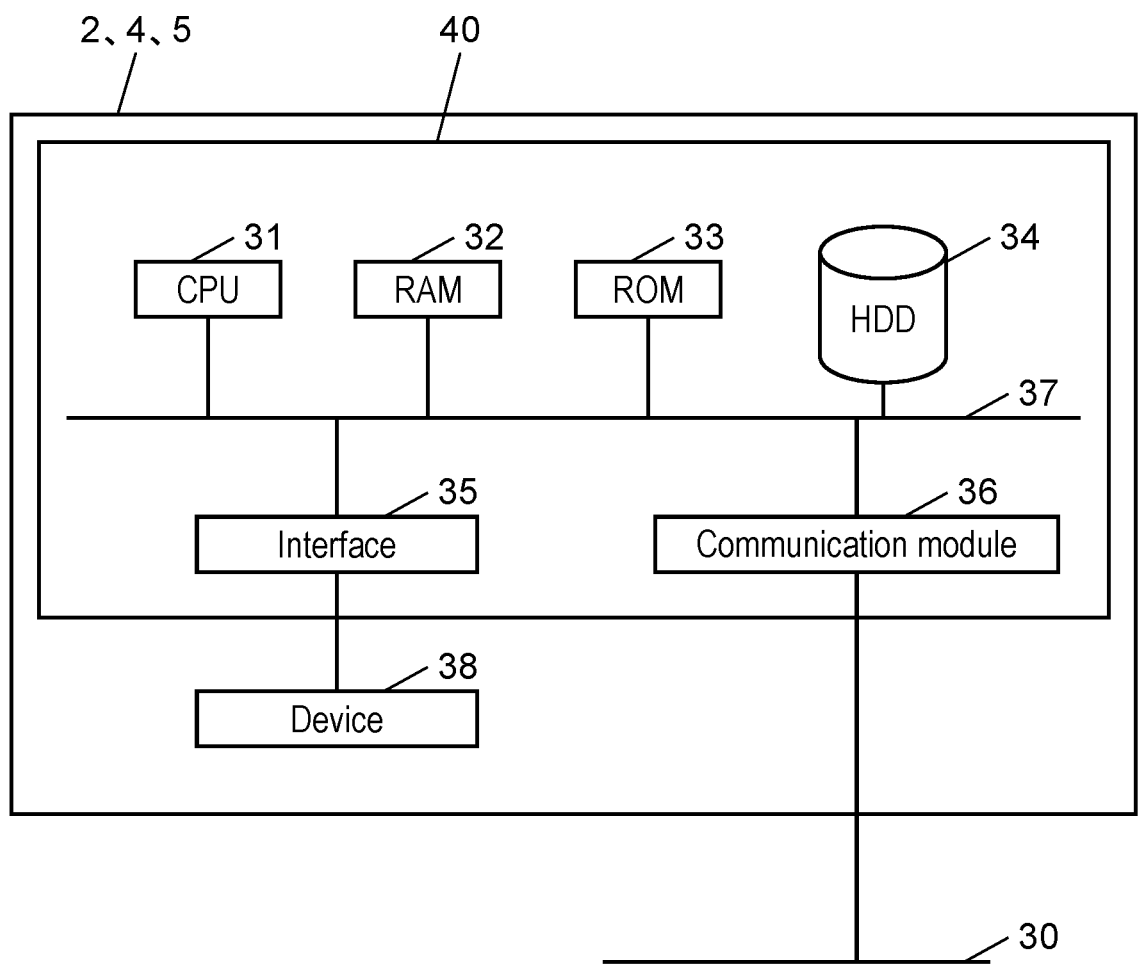
FIG. 3 is a configuration diagram of each of a control terminal, a home appliance, and an outlet plug.

First, a configuration of a home appliance management system according to Embodiment 1 of the present disclosure will be described with reference to FIG. 1 to FIG. 3. FIG. 1 is a schematic diagram of home appliance management system 1 according to Embodiment 1. FIG. 2 is a functional block diagram of home appliance management system 1 according to Embodiment 1. FIG. 3 is a configuration diagram of each of control terminal 5, home appliance 2, and outlet plug 4 according to Embodiment 1.

[Basic Configuration of Home Appliance Management System]

Home appliance management system 1 includes a plurality of home appliances 2, outlet plugs 4, and control terminal 5. In the present embodiment, air purifier 21 and humidifier 22 which control air environment (for example, cleanliness and humidity) in indoor space 6 have been described as configuration examples of home appliances 2. However, in addition to air purifier 21 and humidifier 22, other home appliances 2, such as ventilation fan 23, will be appropriately described to facilitate understanding.

Home appliance management system 1 is installed within a house. Home appliances 2 and control terminal 5 each are placed in any one of a plurality of divided indoor spaces 6 which are spaces inside the house, for example. In FIG. 1, the space inside the house is divided into four indoor spaces 6 which are room 01, room 02, room 03, and room 04. In each of indoor spaces 6, at least one outlet 7 is provided. Outlet plug 4 is connected to each outlet 7.

Outlet plug 4 is connected to home appliance 2 via connection cord 3 so that power can be supplied to home appliance 2.

Control terminal 5 and home appliances 2 are communicatively connected via indoor network 30. The communication method may be any one of a wired method and a wireless method, and may be any method as long as information can be transmitted and received.

Hereinafter, each structural component included in home appliance management system 1 will be described.

In the present embodiment, air purifier 21, humidifier 22, and ventilation fan 23 will be described as specific examples of home appliances 2.

[Air Purifier]

As illustrated in FIG. 2, air purifier 21 includes position information receiving unit 251, function providing unit 252, type information storage 253, and position and type information transmitting unit 254.

Function providing unit 252 provides an air purifying function. Specifically, function providing unit 252 includes suction port 211, discharge port 212, and a fan (not illustrated). Function providing unit 252 guides air from suction port 211 to discharge port 212 by rotating the fan. In other words, function providing unit 252 sucks air in indoor space 6 into air purifier 21 via suction port 211. The sucked air becomes air with dust removed and the like by passing through the filter provided in air purifier 21. Only the air from which dust and the like has been removed is blown into indoor space 6 via discharge port 212. Accordingly, function providing unit 252 purifies the air in indoor space 6. Note that function providing unit 252 indicates the function provided by home appliance 2. For example, the air purifying function of air purifier 21, the humidifying function of humidifier 22, the ventilating function of ventilation fan 23, and the temperature adjusting function of an air conditioner each correspond to the function provided by home appliance 2. In other words, the function providing unit varies depending on home appliance 2. Moreover, by home appliance 2 receiving an operating condition from control terminal 5, function providing unit 252 operates according to the received condition. In other words, control terminal 5 is capable of controlling function providing unit 252.

Position information receiving unit 251 receives, via connection cord 3, the position information from outlet plug 4 to be described later. Here, the position information refers to the number or code stored in outlet plug 4, and may be any information as long as the information can be transmitted and received via indoor network 30. The position information is given to each room in home appliance management system 1. For example, all of outlet plugs 4 belonging to room 03 store the same position information. Outlet plug 4 connected to outlet 7 in a room different from room 03, that is in room 02, stores position information different from outlet plug 4 connected to outlet 7 in room 03. In other words, the position information refers to information indicating the position of the room in which air purifier 21 is placed.

Type information storage 253 stores the type of home appliance 2 having the function provided by function providing unit 252. In other words, here, type information storage 253 stores "air purifier".

Position and type information transmitting unit 254 transmits, to control terminal 5, the position information received by position information receiving unit 251 in combination with the type information stored in type information storage 253.

[Humidifier]

Humidifier 22 includes position information receiving unit 261, function providing unit 262, type information storage 263, and position and type information transmitting unit 264.

Function providing unit 262 provides a humidifying function. Specifically, function providing unit 262 includes a water vapor generator (not illustrated) which generates, for example, water vapor internally, and jetting port 221 which jets the water vapor to indoor space 6. Accordingly, function providing unit 262 humidifies indoor space 6.

Position information receiving unit 261 receives, via connection cord 3, the position information from outlet plug 4 to be described later.

Type information storage 263 stores the type of home appliance 2 having the function provided by function providing unit 262. In other words, here, type information storage 263 stores "humidifier".

Position and type information transmitting unit 264 transmits, to control terminal 5, the position information received by position information receiving unit 261 in combination with the type information stored in type information storage 263.

[Ventilation Fan]

Ventilation fan 23 includes position information receiving unit 271, function providing unit 272, type information storage 273, and position and type information transmitting unit 274.

Function providing unit 272 provides a ventilating function. Specifically, function providing unit 272 includes suction port 231 which sucks indoor air, exhaust port 232 which exhausts the indoor air to outdoor, and fan 233 which generates air flow between suction port 231 and exhaust port 232. Accordingly, function providing unit 272 ventilates indoor space 6.

Position information receiving unit 271 receives, via connection cord 3, the position information from outlet plug 4 to be described later.

Type information storage 273 stores the type of home appliance 2 having the function provided by function providing unit 272. In other words, here, type information storage 273 stores "ventilation fan".

Position and type information transmitting unit 274 transmits, to control terminal 5, the position information received by position information receiving unit 271 in combination with the type information stored in type information storage 273.

[Connection Cord]

Connection cord 3 is provided in home appliance 2, and is connected to outlet plug 4. An example of connection cord 3 is a power cord. In other words, connection cord 3 has a function of supplying power to home appliance 2 from outlet 7 via outlet plug 4, and a function of transmitting the position information from outlet plug 4 to home appliance 2. Note that connection cord 3 may be provided independently from the power cord. In this case, connection cord 3 performs only transmission and reception of information to and from home appliance 2.

[Outlet Plug]

Outlet plugs 4 include position information storages 411, 421, and 431, and position information transmitting units 412, 422, and 432. Outlet plugs 4 each also include an IN terminal and an OUT terminal as physical connection parts.

Position information storages 411, 421, and 431 store the position information of outlet plugs 4. More specifically, for example, position information storage 411 of outlet plug 4 provided in room 03 stores number "03". Moreover, for example, position information storage 421 of outlet plug 4 provided in room 04 stores number "04". In other words, the position information here is information for identifying the position of outlet plug 4.

Position information transmitting units 412, 422, and 432 transmit the position information stored in position information storages 411, 421, and 431 to position information receiving units 251, 261, and 271 of home appliances 2 via connection cords 3.

The IN terminal is connected to outlet 7. The OUT terminal is connected to connection cord 3 of home appliance 2. Outlet plug 4 receives power supply from outlet 7, supplies power to home appliance 2 via connection cord 3, and transmits the position information to home appliance 2. In the case where connection cord 3 is independent from the power cord, outlet plug 4 transmits the position information to home appliance 2 via connection cord 3, and supplies power via the power cord. Outlet plug 4 can be considered as belonging to outlet 7. In other words, when home appliance 2 is moved, home appliance 2 is removed from outlet plug 4, and is connected to outlet plug 4 connected to outlet 7 in another room, for example.

Outlets 7 may include the functions of outlet plugs 4.

[Control Terminal]

Control terminal 5 includes position and type information receiving unit 51, position and type information storage 52, operation controller 54, state information receiving unit 55, and operating condition determining unit 53.

Position and type information receiving unit 51 receives the position information and the type information transmitted from home appliances 2 via indoor network 30.

Position and type information storage 52 stores the position information and the type information of home appliances 2 received by position and type information receiving unit 51 in association with each other.

State information receiving unit 55 receives the state information and the position information of the room in which home appliance 2 is placed. Here, the state information includes information indicating the room environment and information indicating the state of the room. The information indicating the room environment specifically indicates, for example, temperature, humidity, air pressure, lightness (brightness), air pollution level (the amount of dust), information about air composition (carbon dioxide concentration, etc.), odor, or noise level. Moreover, the information indicating the state of the room specifically indicates, for example, power consumption, window opened or closed state, the amount of ventilation in the room, or operating state (ON state, OFF state, strength of the providing function, etc.) of home appliance 2 connected to outlet 7 belonging to the room. A device which transmits the state information is, for example, home appliance 2 itself, or a transmitter which includes, for example, various types of sensors and which is provided in the room independently from home appliance 2. When the state information is to be transmitted from the transmitter which is provided independently from home appliance 2, the transmitter may also be connected to outlet 7 via outlet plug 4. With this configuration, the transmitter is also capable of transmitting the position information of the transmitter to control terminal 5 in a similar mechanism to home appliance 2.

Operating condition determining unit 53 identifies home appliances 2 placed in the room to which the state information belongs, based on the state information and the position information received by state information receiving unit 55, and the position information and the type information stored in position and type information storage 52. Moreover, operating condition determining unit 53 determines the operating conditions for home appliances 2 placed in the room to which the state information belongs, according to the combination of the identified home appliances 2. Since the determination of the operating conditions may vary, representative examples will be described later.

Operation controller 54 causes home appliances 2 to operate according to the operating conditions determined by operating condition determining unit 53, by transmitting the operating conditions to home appliances 2 which are the control targets.

Linked operations of the respective units will be described later using a flowchart.

As illustrated in FIG. 3, control terminal 5, home appliance 2, and outlet plug 4 each include, for example, microcomputer 40.

Microcomputer 40 internally includes CPU (Central Processing Unit) 31, RAM (Random Access Memory) 32, ROM (Read Only Memory) 33, and interface 35. Microcomputer 40 also includes HDD (Hard Disk Drive) 34, and communication module 36. HDD 34 is a device which functions as position and type information storage 52, type information storages 253, 263, and 273, and position information storages 411, 421, and 431. Moreover, communication module 36 is a device which functions as position and type information receiving unit 51, state information receiving unit 55, position information receiving units 251, 261, and 271, position and type information transmitting units 254, 264, and 274, and position information transmitting units 412, 422, and 432. CPU 31, RAM 32, ROM 33, HDD 34, communication module 36, and interface 35 are connected via internal bus 37. Interface 35 is connected to various types of devices 38 provided as external devices. For example, in the case of home appliances 2, devices 38 corresponds to function providing units 252, 262, and 272.

CPU 31 uses RAM 32 as a work area, for example, and executes a program stored in ROM 33. CPU 31 then controls the operations of devices 38 by communicating data and commands with HDD 34 and devices 38 based on the execution result.

Operating condition determining unit 53 and operation controller 54 included in control terminal 5, and the controllers (not illustrated) included in home appliance 2 and outlet plug 4 are programs stored in ROM 33, and execute predetermined processing by being executed by CPU 31, and transmit and receive information (commands) to and from connected devices 38.

HDD 34, ROM 33, and RAM 32 are not necessarily limited to such examples, but other types of memory may be used as long as it functions as a memory.

A device such as communication module 36 does not necessarily have to be included in microcomputer 40, but may be externally connected.

[Information Obtaining Processing Flow in Home Appliance Management System]

Figure 4:
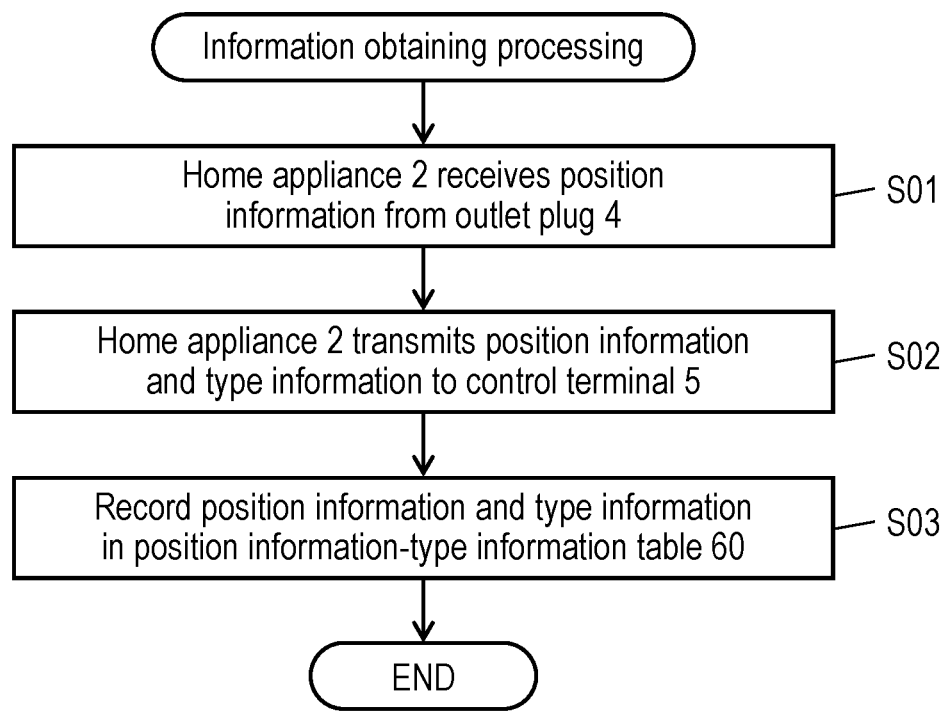
FIG. 4 is a flowchart of information obtaining processing in the home appliance management system.

Next, information obtaining processing in the home appliance management system will be described with reference to FIG. 4 and FIG. 5. FIG. 4 is a flowchart of information obtaining processing in the home appliance management system according to Embodiment 1. FIG. 5 illustrates an example of a relationship table between position information and type information according to Embodiment 1.

First, when home appliances 2 are connected to outlets 7 via outlet plugs 4, position information receiving units 251, 261, and 271 in home appliances 2 receive the position information from outlet plugs 4 via connection cords 3 (S01). Here, the position information indicates, for example, "03" which allows a room to be identified.

When home appliances 2 receive the position information, home appliances 2 further read the type information stored in type information storages 253, 263, and 273. Subsequently, home appliances 2 transmit the received position information and the read type information to control terminal 5 via position and type information transmitting units 254, 264, and 274 and indoor network 30 (S02). The type information transmitted here is assumed to be "air purifier".

The position information and the type information of home appliances 2 transmitted to control terminal 5 are received by position and type information receiving unit 51, and are stored (recorded) in position information-type information table 60 in position and type information storage 52 (S03). Here, FIG. 5 illustrates position information-type information table 60 stored in position and type information storage 52. In position information-type information table 60, as the information transmitted from home appliance 2, for example, the position information "03" and the type information "air purifier" are associated with each other and stored as record 61.

Accordingly, control terminal 5 is capable of recognizing that the "air purifier" which provides the air purifying function is placed in room 03 indicated by the position information "03".

The above processing is performed by each home appliance 2 connected to outlet 7 via outlet plug 4 in all rooms. Accordingly, position information-type information table 60, which indicates the relationship between the position information and the type information illustrated in FIG. 5, is generated in control terminal 5. Position information-type information table 60 illustrated in FIG. 5 indicates that ventilation fan 23 is placed in room 02, humidifier 22 and ventilation fan 23 are placed in room 04, and air purifier 21, humidifier 22, a dehumidifier, and ventilation fan 23 are placed in room 03. Moreover, it is indicated that home appliance 2 is not placed in room 01, or even if home appliance 2 is placed in room 01, home appliance 2 does not correspond to home appliance management system 1.

The above processing is performed by each home appliance 2 every predetermined period (for example, one hour). Position information-type information table 60 is capable of maintaining the latest state by being deleted on a per-record basis, for example, every predetermined period (for example, one hour).

[Home Appliance Operating Processing Flow in Home Appliance Management System]

Figure 6:
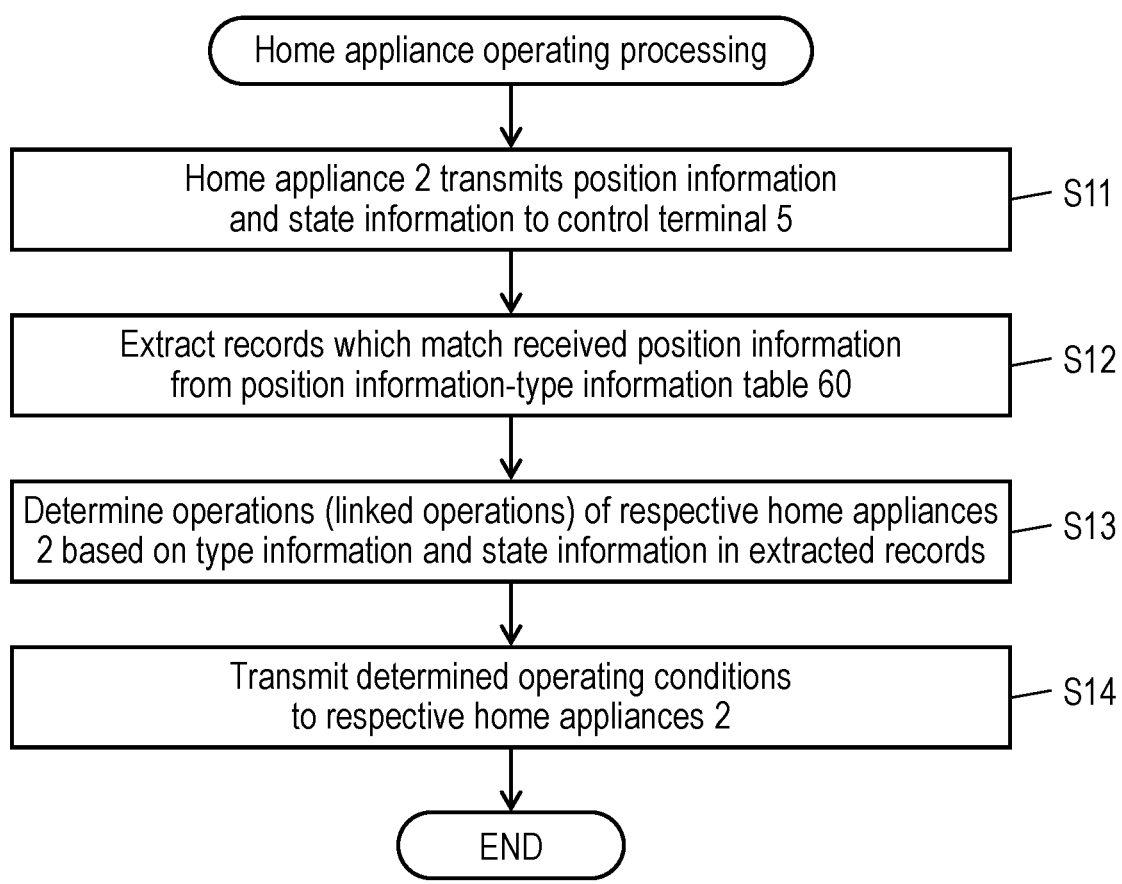
FIG. 6 is a flowchart of home appliance operating processing in the home appliance management system.

Next, home appliance operating processing in home appliance management system 1 will be described with reference to FIG. 5 and FIG. 6. FIG. 6 is a flowchart of the home appliance operating processing according to Embodiment 1.

After the position information and the type information are transmitted to control terminal 5, for example, air purifier 21 which is home appliance 2 transmits, to control terminal 5 via a transmitting unit (for example, position and type information transmitting unit 254), the state information and the position information obtained via a dust sensor included in air purifier 21 (S11). The information transmitted here is, for example, "dust: large amount" as the state information, and "03" received from outlet plug 4 as the position information. In the present embodiment, the state information is obtained by a sensor included in home appliance 2, and is transmitted to control terminal 5 from a transmitting unit included in home appliance 2, but the present disclosure is not limited to such an example. For example, it may be that the state information is obtained by a sensor provided in indoor space 6 independently from home appliance 2 and is transmitted to control terminal 5 from the sensor.

When control terminal 5 receives the state information and the position information from air purifier 21, operating condition determining unit 53 included in control terminal 5 refers to position information-type information table 60, and extracts records having position information "03" which is identical to the received position information "03" (S12). Here, records 61, 62, 63, and 64 are extracted.

Operating condition determining unit 53 is capable of recognizing the types of home appliances 2 belonging to room 03, that is, the functions provided by home appliances 2, by extracting the records. Here, since records 61, 62, 63, and 64 are extracted, the air purifier, the humidifier, the dehumidifier, and the ventilation fan are recognized as the types of home appliances 2. Moreover, as the providing functions, the air purifying function, the humidifying function, and the ventilating function are recognized. Subsequently, operating condition determining unit 53 determines the linked operations of respective home appliances 2, based on the combination of the state information of room 03 and home appliances 2 belonging to room 03 (S13). The linked operations, that is, the operating conditions for home appliances 2 can vary depending on the combination of home appliances 2, and thus, only one example will be described here.

When operating condition determining unit 53 determines the operating conditions for home appliances 2, operating condition determining unit 53 transmits the determined operating conditions to operation controller 54.

Operation controller 54 transmits the operating conditions determined by operating condition determining unit 53 to respective home appliances 2 via indoor network 30 as operation commands (S14). In other words, operation controller 54 transmits the operating conditions determined by operating condition determining unit 53 to corresponding home appliances 2. The term "corresponding home appliances 2" here refers to home appliances 2 having position information which is identical to the position information of home appliance 2 which has transmitted the position information. Accordingly, operation controller 54, that is, control terminal 5 controls function providing units 252, 262, and 272 of respective home appliances 2.

Hereinafter, an example of the linked operations of home appliances 2 will be described. In the present embodiment, as an example, the linked operations of home appliances 2 belonging to room 03 will be described. Note that home appliances 2 belonging to room 03 are, as illustrated in FIG. 5, air purifier 21, humidifier 22, ventilation fan 23, and dehumidifier.

In the present embodiment, as described above, state information receiving unit 55 has received the state information indicated as "dust: large amount". Hence, operating condition determining unit 53 causes air purifier 21 to operate at the maximum air purifying ability, based on the state information indicated as "dust: large amount". The air purifying ability is indicated by, for example, "strong", "medium", and "weak". Here, in order to cause air purifier 21 to operate at the maximum state, "strong" is selected as the air purifying ability. When air purifier 21 is operating, ventilation fan 23 is stopped, so that air flow inside and outside the room is stopped to prevent outside air from flowing into the room. In other words, the situation where dust is freshly borne into the room is prevented. Moreover, by stopping the operation of humidifier 22, the situation is prevented where dust absorbs moisture, making the dust become heavier and air purifier 21 being unlikely to suck up the dust. By operating the dehumidifier, the moisture in dust is reduced so that efficiency of air purifier 21 is increased. The operations described above are continuously performed by home appliances 2, for example, for ten minutes.

In contrast, when state information receiving unit 55 receives state information indicated as "dust: small amount", operating condition determining unit 53 stops the operation of air purifier 21 based on the state information indicated as "dust: small amount". Control terminal 5 then causes the humidifying function or the dehumidifying function based on the temperature information to be operated, and also causes the ventilating function to be operated at the minimum necessary ventilation amount based on the indoor outdoor temperature difference information. Accordingly, home appliance management system 1 provides comfortable indoor space while reducing dust borne into the room.

The example of the linked operations of home appliances 2 has been described above. In each room, control terminal 5 is capable of causing home appliances 2 belonging to the same room to operate in conjunction with each other.

Home appliances 2 are often the ones a user can freely select for placement in a room, instead of the ones installed in the room. Accordingly, such a system, which requires the room in which home appliance 2 is placed to be recorded every time home appliance 2 is moved as in a conventional method, is not realistic for home appliance 2. In contrast, in home appliance management system 1 according to the present embodiment, the position information is obtained via outlet plug 4. Hence, for example, even when home appliance 2 is moved to another room, the position information of home appliance 2 which has been moved is automatically obtained from outlet plug 4 to which home appliance 2 is newly connected. Accordingly, control terminal 5 is capable of recognizing the position information of home appliance 2 which has been moved to another room. This does not require the user to record the position or the like each time, leading to a user-friendly home appliance management system.

(Variation)

The position information stored in outlet plug 4 may be electrically stored in a memory. However, in this case, the position information of outlet plug 4 cannot be easily changed. Accordingly, it may be that outlet plug 4 includes a physical switch which allows selection between 01 and 10, for example, so that the user changes the number of the physical switch in each room. In such a case, position information storages 411, 421, and 431 read the numbers selected by the physical switches, and position information transmitting units 412, 422, and 432 transmit the read numbers to home appliances 2.

Moreover, it may be that outlet 7 and outlet plug 4 are integrated so that outlet 7 in each room has the functions of outlet plug 4. In such a case, when home appliance 2 is moved, it is possible to prevent outlet plug 4 from being mistakenly moved along home appliance 2, and also to reduce the cost.

The position information stored in position information storages 411, 421, and 431 does not necessarily have to match the room numbers assigned by control terminal 5. It is possible to control home appliance information in each room by associating position information storages 411, 421, and 431 of outlet plugs 4 with the room numbers assigned by control terminal 5.

Embodiment 2

In home appliance management system 1 according to Embodiment 1, control terminal 5 directly transmits the operating conditions to home appliances 2 which are the control targets to control respective home appliances 2. In contrast, in a home appliance management system according to Embodiment 2, a control terminal transmits the operating conditions to outlet plugs. The outlet plugs then transmit the received operating conditions to respective home appliances.

Figure 7:
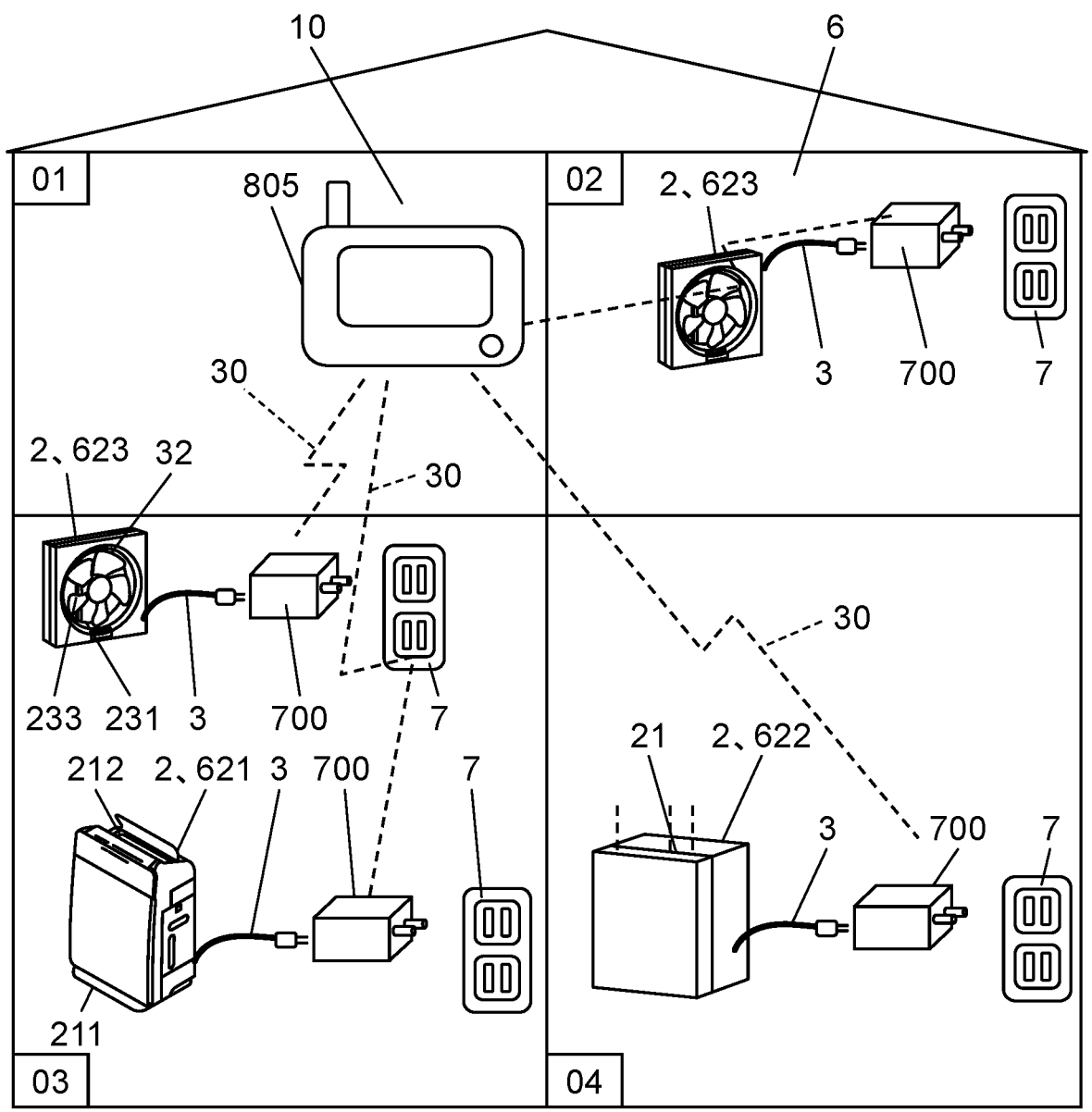
FIG. 7 is a schematic diagram of a home appliance management system according to Embodiment 2.
Figure 8:
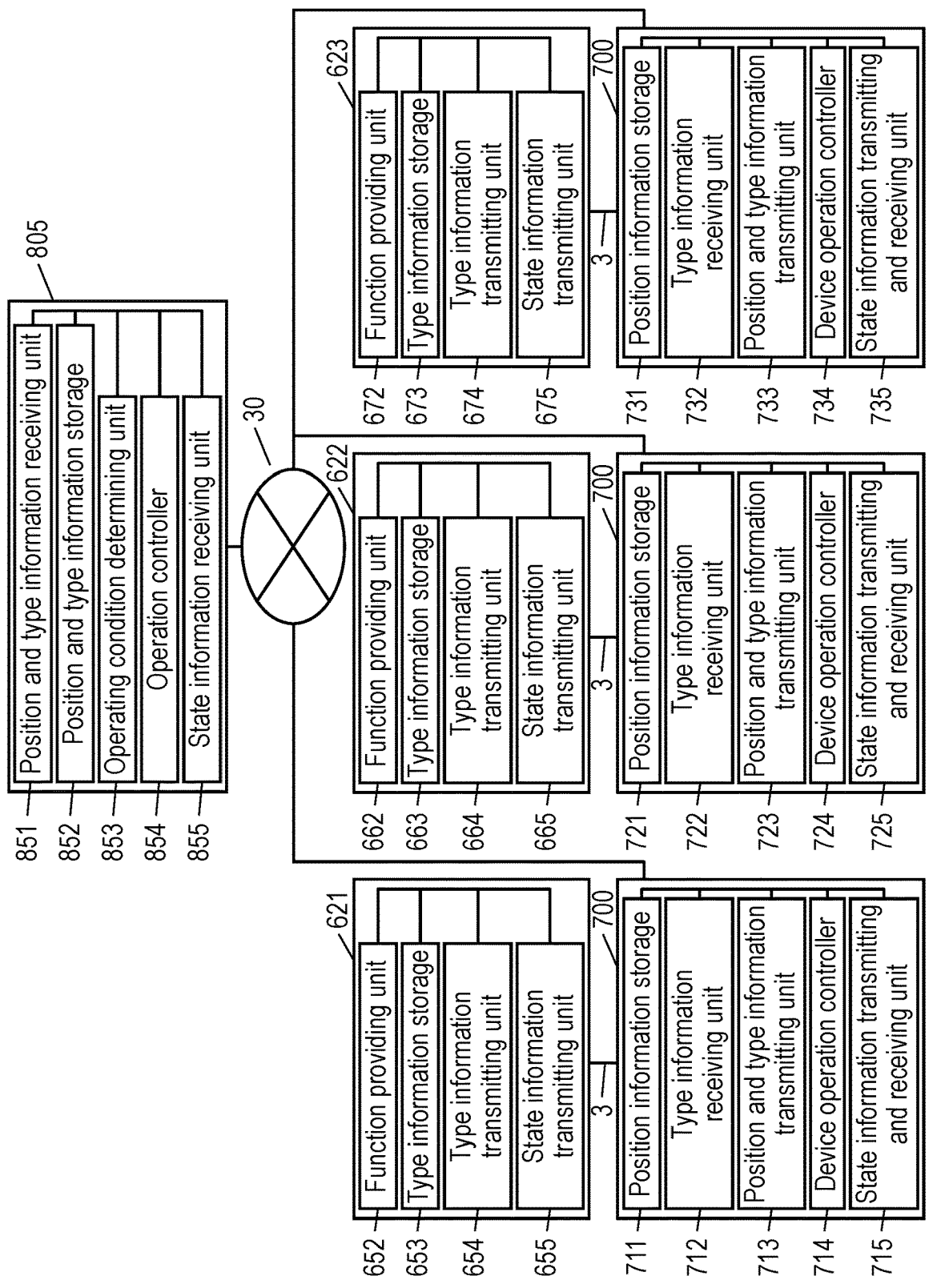
FIG. 8 is a functional block diagram of the home appliance management system.
Figure 9:
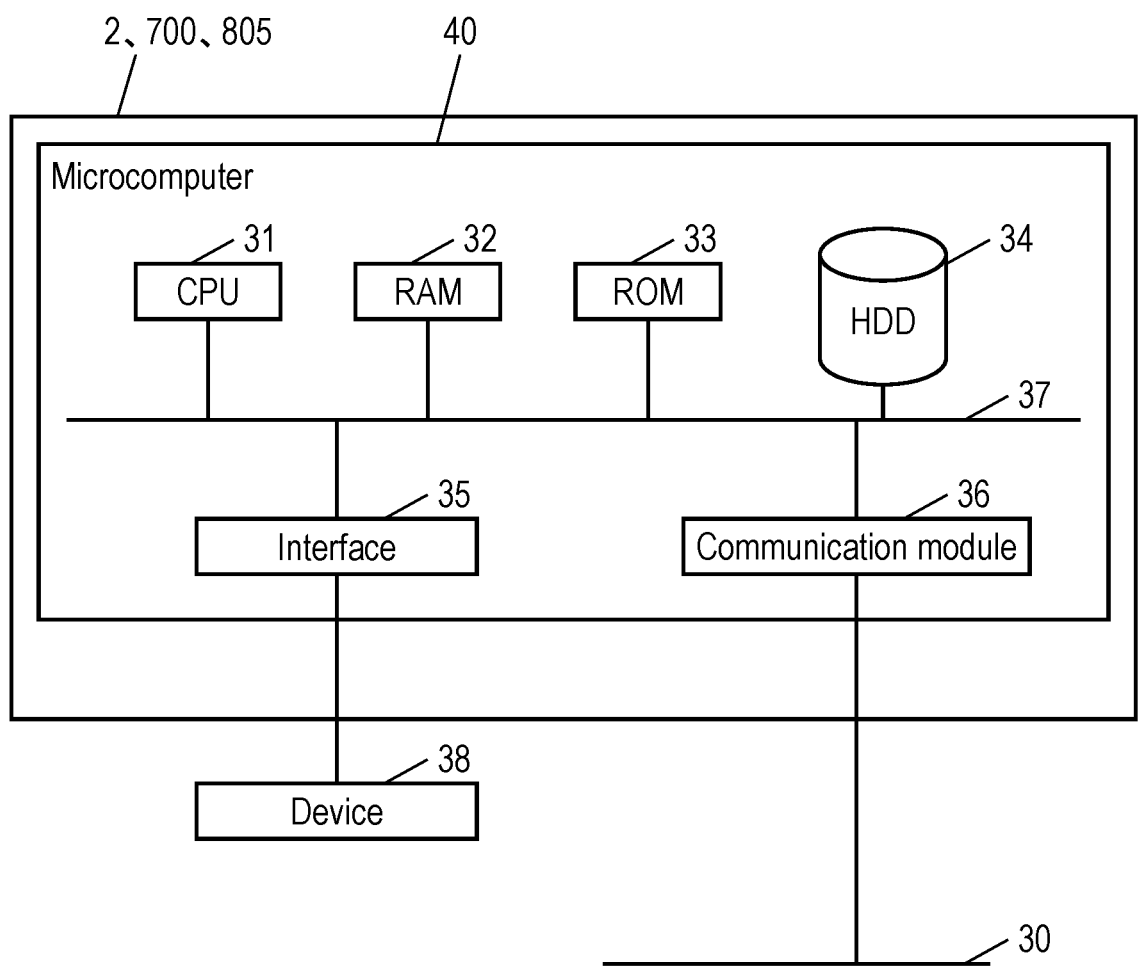
FIG. 9 is a configuration diagram of each of a control terminal, a home appliance, and an outlet plug.

Hereinafter, a configuration of the home appliance management system according to Embodiment 2 of the present disclosure will be described with reference to FIG. 7 and FIG. 8. FIG. 7 is a schematic diagram of home appliance management system 10 according to Embodiment 2. FIG. 8 is a functional block diagram of home appliance management system 10 according to Embodiment 2. FIG. 9 illustrates a configuration of each of control terminal 805, home appliance 2, and outlet plug 700 according to Embodiment 2.

The same reference numbers are assigned to the structural components which are the same as Embodiment 1, and the detailed descriptions thereof are omitted.

[Basic Configuration of Home Appliance Management System]

Home appliance management system 10 includes a plurality of home appliances 2, outlet plugs 700, and control terminal 805.

Control terminal 805 and outlet plugs 700 are communicatively connected to each other via indoor network 30.

Hereinafter, each structural component included in home appliance management system 10 will be described.

[Air Purifier]

Air purifier 621 includes function providing unit 652, type information storage 653, type information transmitting unit 654, and state information transmitting unit 655.

Since function providing unit 652 and type information storage 653 are similar to function providing unit 252 and type information storage 253 according to Embodiment 1, descriptions thereof are omitted.

Type information transmitting unit 654 transmits the type information stored in type information storage 653 to outlet plug 700.

State information transmitting unit 655 transmits the state information of the room where air purifier 621 is placed to outlet plug 700. Here, the state information includes information indicating the room environment and information indicating the state of the room. Since the state information in the present embodiment is similar to the state information described in Embodiment 1, description thereof is omitted.

[Humidifier]

Humidifier 622 includes function providing unit 662, type information storage 663, type information transmitting unit 664, and state information transmitting unit 665.

Since function providing unit 662 and type information storage 663 are similar to function providing unit 262 and type information storage 263 according to Embodiment 1, descriptions thereof are omitted.

Type information transmitting unit 664 transmits the type information stored in type information storage 663 to outlet plug 700.

State information transmitting unit 665 also transmits the state information of the room where humidifier 622 is placed to outlet plug 700.

[Ventilation Fan]

Ventilation fan 623 includes function providing unit 672, type information storage 673, type information transmitting unit 674, and state information transmitting unit 675.

Since function providing unit 672 and type information storage 673 are similar to function providing unit 272 and type information storage 273 according to Embodiment 1, descriptions thereof are omitted.

Type information transmitting unit 674 transmits the type information stored in type information storage 673 to outlet plug 700.

State information transmitting unit 675 also transmits the state information of the room where ventilation fan 623 is placed to outlet plug 700.

[Connection Cord]

Connection cord 3 is provided to each home appliance 2, and is connected to outlet plug 700. An example of connection cord 3 is a power cord. In other words, connection cord 3 has a function of supplying power to home appliance 2 via outlet plug 700 from outlet 7, and a function of transmitting and receiving the type information and the operating condition from outlet plug 700 to home appliance 2. Note that different connection cord 3 that is independent from the power cord may be provided. In this case, connection cord 3 performs only transmission and reception of information to and from home appliance 2.

[Outlet Plug]

Outlet plugs 700 include position information storages 711, 721, and 731, type information receiving units 712, 722, and 732, position and type information transmitting units 713, 723, and 733, device operation controllers 714, 724, and 734, and state information transmitting and receiving units 715, 725, and 735. Outlet plugs 700 each also include an IN terminal and an OUT terminal as physical connection parts.

Since position information storages 711, 721, and 731 are similar to position information storages 411, 421, and 431 according to Embodiment 1, descriptions thereof are omitted.

Type information receiving units 712, 722, and 732 receive type information from home appliances 2 via connection cords 3.

Position and type information transmitting units 713, 723, and 733 transmit, to control terminal 805, the position information stored in position information storages 711, 721, and 731 in combination with the type information received by type information receiving units 712, 722, and 732 from home appliances 2.

Device operation controllers 714, 724, and 734 transmit the operating conditions for home appliances 2 received from control terminal 805, to function providing units 652, 662, and 672 of home appliances 2 via connection cords 3.

State information transmitting and receiving units 715, 725, and 735 receive the state information of the rooms where home appliances 2 are placed from state information transmitting units 655, 665, and 675, and transmit the received state information to control terminal 805.

The IN terminal is connected to outlet 7. The OUT terminal is connected to connection cord 3 of home appliance 2. Outlet plug 700 receives power supply from outlet 7 to supply power to home appliance 2 via connection cord 3, and also transmits and receives the type information and the operating condition to and from home appliance 2. In the case where connection cord 3 is independent from the power cord, outlet plug 700 transmits and receives the type information and the operating condition to and from home appliance 2 via connection cord 3 and supplies power via the power cord. Outlet plug 700 can be considered as belonging to outlet 7. In other words, when home appliance 2 is moved, connection cord 3 of home appliance 2 is removed from outlet plug 700, and, for example, is connected to outlet plug 700 connected to outlet 7 in another room.

Outlets 7 may include the functions of outlet plugs 700.

[Control Terminal]

Control terminal 805 includes position and type information receiving unit 851, position and type information storage 852, operation controller 854, state information receiving unit 855, and operating condition determining unit 853.

Position and type information receiving unit 851 receives the position information and the type information transmitted from outlet plugs 700 via indoor network 30.

Position and type information storage 852 stores the position information of outlet plugs 700 received by position and type information receiving unit 851 in association with the type information of home appliances 2 connected to outlet plugs 700.

State information receiving unit 855 receives the state information and the position information of the rooms in which home appliances 2 are placed. The state information here is similar to Embodiment 1, and thus, the description thereof is omitted. The state information is, as described above, received by state information receiving unit 855 via state information transmitting units 655, 665, and 675, and state information transmitting and receiving units 715, 725, and 735. In the present embodiment, state information transmitting units 655, 665, and 675 which transmit the state information are included in home appliances 2, but the present disclosure is not limited to such an example. It may be that state information transmitting units 655, 665, and 675 are included in, other than home appliances 2, for example, outlet plugs 700 themselves, or in transmitters which include various types of sensors or the like and which are independent from outlet plugs 700 in the rooms. In the case where the state information is transmitted from a transmitter that is independent from outlet plug 700, the transmitter may also be connected to outlet 7 via outlet plug 700. With such configuration, the transmitter is also capable of transmitting the position information to control terminal 805 in a similar mechanism to outlet plug 700.

Operating condition determining unit 853 identifies home appliances 2 placed in the room to which the state information belongs, based on the state information and the position information received by state information receiving unit 855, and the position information and the type information stored in position and type information storage 852. Moreover, operating condition determining unit 853 determines the operating conditions for home appliances 2 placed in the room to which the state information belongs, according to the combination of the identified home appliances 2. Since the determination of the operating conditions may vary, representative examples will be described later.

By transmitting the operating conditions determined by operating condition determining unit 853 to outlet plugs 700 to which home appliances 2 which are control targets are connected, operation controller 854 causes home appliances 2 to operate according to the transmitted operating conditions.

The linked operations of the respective units will be described later using a flowchart.

Control terminal 805, home appliance 2, and outlet plug 700 each include microcomputer 40 as an example as illustrated in FIG. 9. The configuration of microcomputer 40 is similar to Embodiment 1, and thus, description thereof is omitted. In the present embodiment, HDD 34 is a device which functions as position and type information storage 852, type information storages 653, 663, and 673, and position information storages 711, 721, and 731. Communication module 36 is a device which functions as position and type information receiving unit 851, state information receiving unit 855, type information transmitting units 654, 664, and 674, state information transmitting units 655, 665, and 675, type information receiving units 712, 722, and 732, and state information transmitting and receiving units 715, 725, and 735.

[Information Obtaining Processing Flow in Home Appliance Management System]

Figure 10:
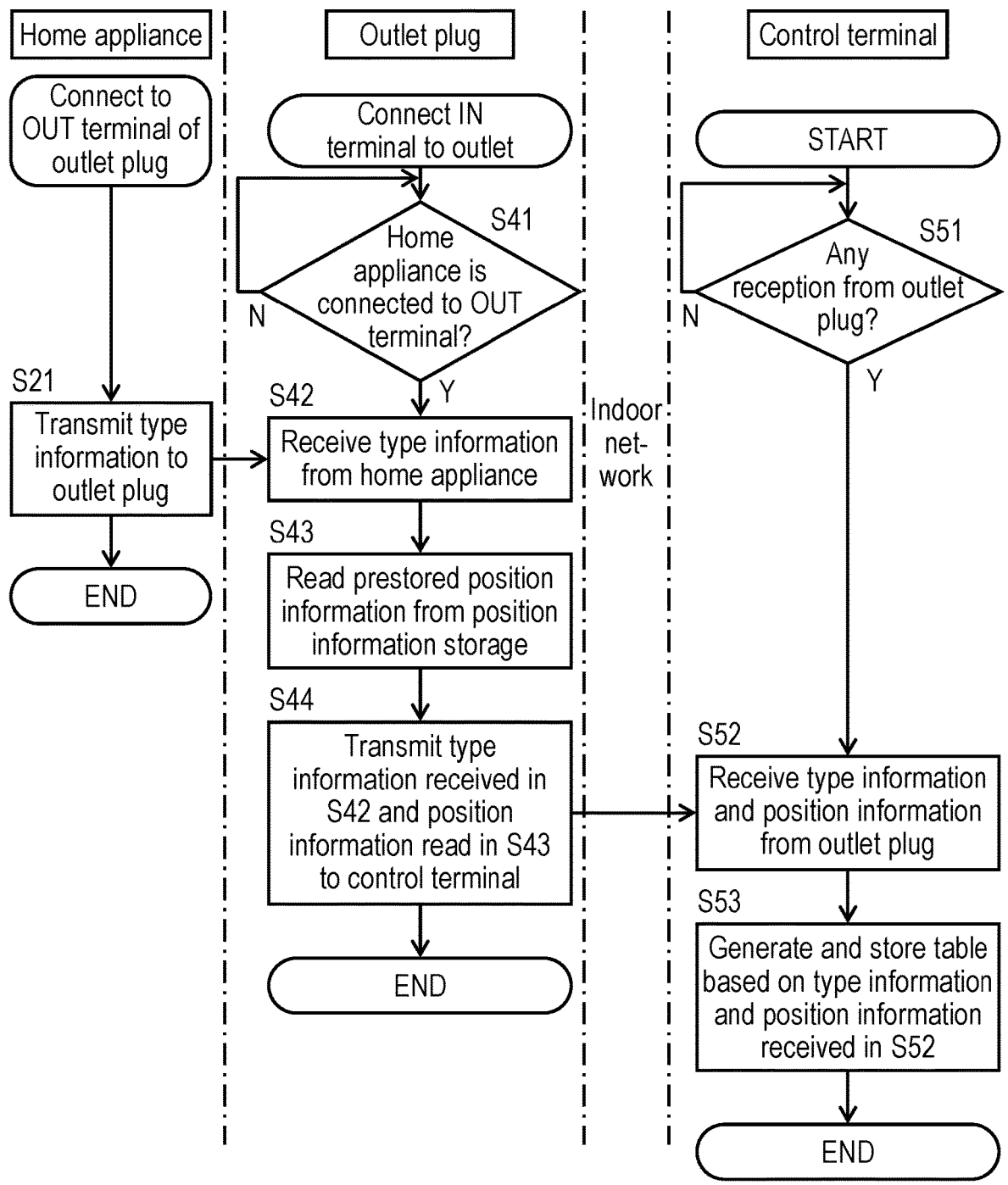
FIG. 10 is a flowchart of information obtaining processing in the home appliance management system.
Figure 11:
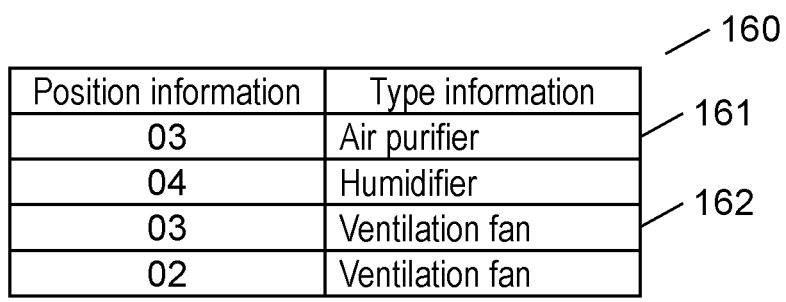
FIG. 11 illustrates an example of a relationship table between position information and type information.

Subsequently, information obtaining processing in home appliance management system 10 will be described with reference to FIG. 10 and FIG. 11. FIG. 10 is a flowchart of the information obtaining processing in home appliance management system 10 according to Embodiment 2. FIG. 11 illustrates an example of a relationship table between position information and type information according to Embodiment 2. As an example of the information obtaining processing, processing for obtaining information from air purifier 621 in room 03 will be described.

First, when the IN terminal of outlet plug 700 is connected to outlet 7, power is supplied from outlet 7 to outlet plug 700. Subsequently, outlet plug 700 connected to outlet 7 determines whether or not home appliance 2 is connected to the OUT terminal of outlet plug 700, by using microcomputer 40 in outlet plug 700 (S41). Here, outlet plug 700 repeats the above determination till home appliance 2 is connected to the OUT terminal.

When connection cord 3 is connected to the OUT terminal of outlet plug 700 connected to outlet 7, home appliance 2 receives power supply from outlet 7. Home appliance 2 which has received power supply transmits the type information prestored in type information storage 653 to outlet plug 700 via interface 35 and connection cord 3 (S21). The type information is "air purifier", and may be text information or unique information indicating the air purifier. As long as the information allows "air purifier" to be identified in the home appliance management system, the type information is not particularly limited.

When outlet plug 700 determines that home appliance 2 is connected to the OUT terminal of outlet plug 700, type information receiving unit 712 receives the type information from home appliance 2 via interface 35 (S42).

Next, outlet plug 700 reads the position information prestored in position information storage 711 (S43). Here, the position information indicates, for example, "03" which allows the room to be identified. Note that the position information is "03", and may be text information or unique information indicating room information. As long as the position information allows room "03" to be identified in the home appliance management system, the position information is not particularly limited.

Outlet plug 700 then transmits, to control terminal 805, the type information received from home appliance 2 and the position information read from position information storage 711, via indoor network 30 from position and type information transmitting unit 713 (S44). The type information transmitted here is information indicating "air purifier", and the position information is information indicating room "03".

Control terminal 805 has started the information obtaining processing, without synchronizing with the operations of home appliance 2 and outlet plug 4. In other words, control terminal 805 determines whether control terminal 805 has received the type information and the position information from outlet plug 700 via indoor network 30 (S51). Here, control terminal 805 repeats the above determination till control terminal 805 receives the type information and the position information from outlet plug 700.

When control terminal 805 determines that the type information and the position information have been transmitted from outlet plug 700, position and type information receiving unit 851 receives the position information and the type information transmitted from outlet plug 700 via indoor network 30 (S52).

Next, control terminal 805 generates position information-type information table 160 based on the received position information and type information, and stores (records) the generated table 160 (S53). Here, FIG. 11 illustrates position information-type information table 160 stored in position and type information storage 852. Position information-type information table 160 stores, as information transmitted from outlet plug 700, record 161 in which, for example, information indicating "03" that is position information is associated with information indicating "air purifier" that is type information.

The above information obtaining processing allows control terminal 805 to recognize that the "air purifier" which provides the air purifying function is placed in room 03 indicated by position information "03".

The processing described above is performed by outlet plugs 700 in all rooms. Accordingly, position information-type information table 160 which indicates the relationship between position information and type information illustrated in FIG. 11 is generated in position and type information storage 852 in control terminal 805.

Position information-type information table 160 illustrated in FIG. 11 indicates that ventilation fan 623 is placed in room 02, air purifier 621 and ventilation fan 623 are placed in room 03, and humidifier 622 is placed in room 04. Moreover, position information-type information table 160 also indicates that home appliance 2 is not placed in room 01, or that even if home appliance 2 is placed in room 01, home appliance 2 does not correspond to the home appliance management system according to the present embodiment.

In the information obtaining processing described above, when home appliance 2 is connected to outlet plug 700, outlet plug 700 transmits the position information and the type information to control terminal 805. However, the present disclosure is not limited to such an example. For example, it may be that outlet plug 700 has a timer function, and each outlet plug 700 transmits position information and type information to control terminal 805 every predetermined period (for example, 10 minutes). Moreover, position information-type information table 160 is capable of maintaining the latest state by being deleted on a per-record basis, for example, every predetermined period (for example, ten minutes).

[Home Appliance Operating Processing Flow in Home Appliance Management System]

Figure 12:
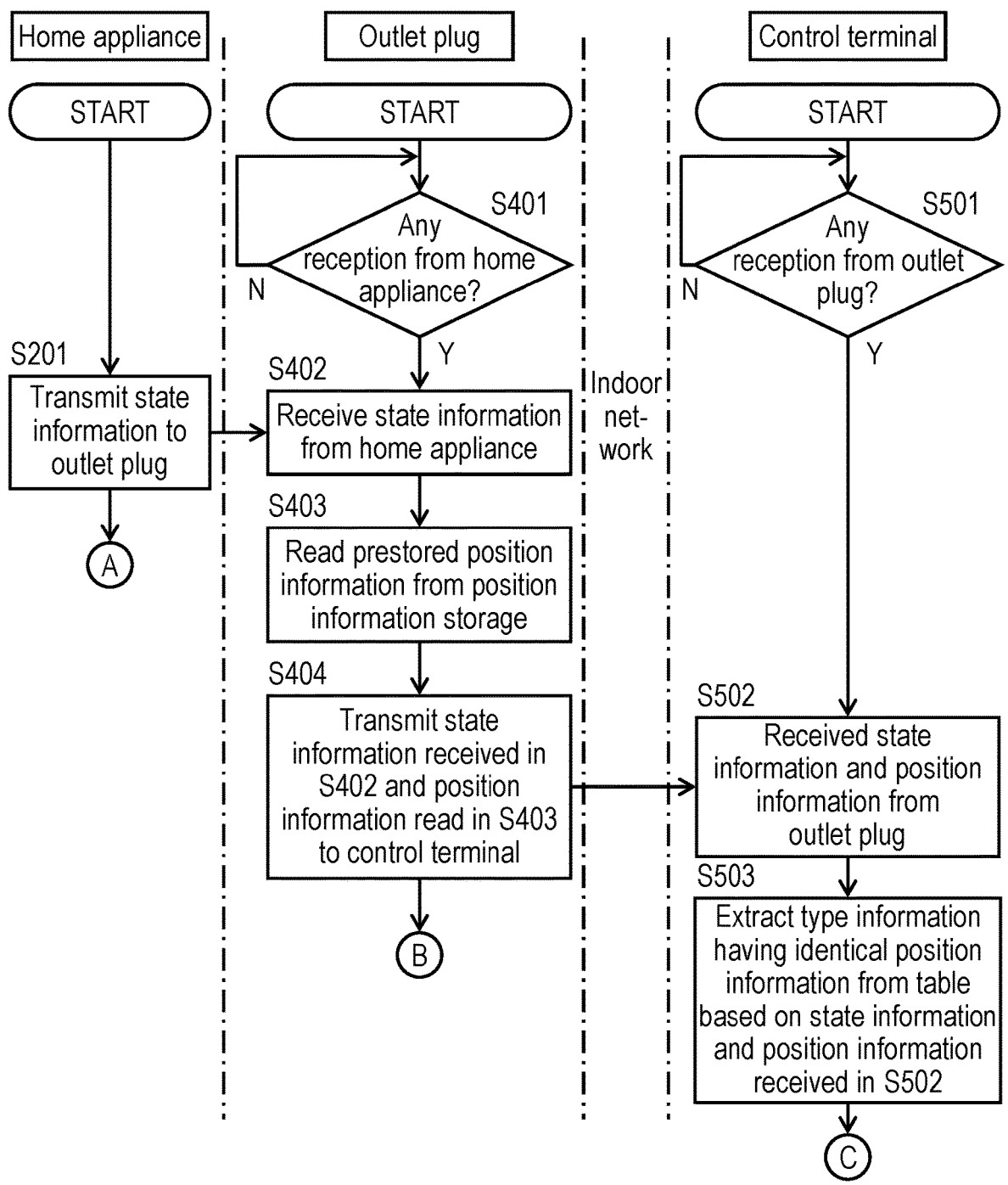
FIG. 12 is a flowchart of home appliance operating processing in the home appliance management system.

Subsequently, home appliance operating processing in home appliance management system 10 will be described with reference to FIG. 11 to FIG. 13. FIG. 12 and FIG. 13 each are a flowchart of the home appliance operating processing according to Embodiment 2. As an example of the home appliance operating processing, a case where processing is performed based on the state information from air purifier 21 in room 03 will be described.

Home appliance 2 causes state information transmitting unit 655 to transmit the current state information of home appliance 2 to outlet plug 700 via connection cord 3 (S201). For example, when home appliance 2 is air purifier 621, the state information obtained via a dust sensor (not illustrated) included in air purifier 621 is transmitted to outlet plug 700. The state information transmitted here is, for example, "dust: large amount". Note that the state information is "dust: large amount", and may be text information or unique information indicating that there are a large amount of dust. As long as the state information allows the state "dust: large amount" to be recognized in home appliance management system 10, the state information is not particularly limited.

When outlet plug 700 determines that outlet plug 700 has received the state information from home appliance 2 (S401), state information transmitting and receiving unit 715 receives the state information (S402).

Next, outlet plug 700 reads the position information prestored in position information storage 711 (S403). Here, the position information indicates, for example, "03" which allows a room to be identified. Note that the position information is "03", and may be text information or unique information indicating room information. As long as the position information allows room "03" to be identified in the home appliance management system, the position information is not particularly limited.

Outlet plug 700 then causes state information transmitting and receiving unit 715 to transmit, to control terminal 805 via indoor network 30, the state information received from home appliance 2 and the position information read from position information storage 711. The state information transmitted here is information indicating "dust: large amount", and the position information transmitted here is information indicating room "03".

Control terminal 805 has started the home appliance operating processing without synchronizing with the operations of home appliance 2 and outlet plug 700. In other words, control terminal 805 determines whether or not control terminal 805 has received the state information and the position information from outlet plug 700 via indoor network 30 (S501). Here, control terminal 805 repeats the above determination till control terminal 805 receives the state information and the position information from outlet plug 700.

Next, when control terminal 805 determines that control terminal 805 has received the state information and the position information from outlet plug 700, state information receiving unit 855 receives the state information and the position information transmitted from outlet plug 700 via communication module 36 (S502).

Control terminal 805 then extracts, from position information-type information table 160, records having position information "03" which is identical to the received position information "03", based on the state information and the position information received from outlet plug 700 (S503). Here, records 161 and 162 are extracted, and the air purifier and the ventilation fan are extracted as the type information. Accordingly, control terminal 805 is capable of recognizing the types of home appliances belonging to room 03, that is the providing functions provided by home appliances 2.

Next, operating condition determining unit 853 determines conditions for linked operations for improving the state of the state information, from the home appliances (type information) having the position information extracted from position information-type information table 160 based on the state information and the position information received from outlet plug 700 (S504).

Control terminal 805 then transmits the position information which matches the conditions for linked operations and operation commands for operating home appliances (type information) to outlet plug 700 via communication module 36 and indoor network 30 (S505). The determination of the conditions for linked operations, that is, the linked operations can vary depending on the combination of home appliances 2, and thus, only one example will be described.

In the present embodiment, for example, operating condition determining unit 853 sets air purifier 621 belonging to position information "03" to "strong" based on the state information indicated as "dust: large amount" to cause air purifier 621 to operate at the maximum air purifying ability. When air purifier 621 is operating, ventilation fan 623 is stopped, so that air flow inside and outside the room is stopped to prevent outside air from flowing into the room. Moreover, when the state information indicates "dust: small mount", the operation of air purifier 621 belonging to position information "03" is stopped, and ventilation fan 623 is operated at the minimum necessary ventilation amount based on the outside and inside temperature difference information included in the state information so that the situation where dust is borne into the room is suppressed while providing comfortable indoor space. In the present embodiment, operation commands corresponding to the state information indicated as "dust: large amount" are provided.

Next, outlet plug 700 to which home appliance 2 which follows the operation command transmitted from control terminal 805 is connected receives, by state information transmitting and receiving unit 715, the operation command transmitted from control terminal 805 via indoor network 30 (S405).

Outlet plug 700 transmits the operation command received from control terminal 805 to home appliance 2 connected to outlet plug 700 via interface 35 and connection cord 3 (S406).

Home appliance 2 is air purifier 621, and function providing unit 652 performs operation based on the operation command received from outlet plug 700 via interface 35 and connection cord 3 (S202). In the present embodiment, the state information indicates "dust: large amount", and thus, the control command from control terminal 805 is an operation command for setting air purifier 621 belonging to position information "03" to "strong", and causing air purifier 621 to operate at the maximum air purifying ability. In other words, air purifier 621 in room "03" is operated at "strong". Moreover, ventilation fan 623 belonging to position information "03" and outlet plug 700 connected to ventilation fan 623 also receive the operation command from control terminal 805, following the above processing flow. In the present embodiment, the control command from control terminal 805 is an operation command for stopping ventilation fan 623 belonging to position information "03", and ventilation 623 in room "03" is stopped.

In this manner, in each room, control terminal 805 is capable of causing home appliances 2 belonging to the same room to operate in conjunction with each other.

Note that in the above home appliance operating processing, home appliance 2 has a timer function, and home appliance 2 transmits the state information and the position information to control terminal 805 every predetermined period (for example, ten minutes).

Moreover, in the present embodiment, home appliances 2 transmit the state information and the position information to control terminal 805 every predetermined period. However, it may be that control terminal 805 serves as a host, and instructs home appliances 2 stored (recorded) in position information-type information table 160 to transmit the state information in the recorded order, by polling, and in response to the instruction, home appliances 2 transmit the state information and the position information to control terminal 805.

Home appliances 2 are often the ones a user can freely select for placement in a room, instead of the ones installed in the room. Accordingly, such a system, which requires the room in which home appliance 2 is placed to be recorded each time home appliance 2 is moved as in a conventional method, is not realistic for home appliance 2. In contrast, in home appliance management system 10 according to the present embodiment, the position information can be obtained via outlet plug 700. Hence, for example, even when home appliance 2 is moved to another room, the position information can be automatically obtained from outlet plug 700 to which home appliance 2 is newly connected. Accordingly, control terminal 805 is capable of recognizing the position easily. This does not require the user to record the position or the like each time, leading to a user-friendly home appliance management system 10.

(Variation)

The position information prestored in outlet plug 700 may be electrically stored in a memory. However, in this case, the position information of outlet plug 700 cannot easily be changed. Accordingly, it may be that each outlet plug 700 includes a physical switch selectable between 01 and 10, for example, so that the number of the physical switch is changed by the user in each room. In this case, position information storages 711, 721, and 731 read the numbers selected by the physical switches, and position and type information transmitting units 713, 723, and 733 transmit the read numbers to control terminal 805.

Moreover, it may be that outlet 7 and outlet plug 700 are integrated so that outlet 7 in each room has similar functions to outlet plug 700. In such a case, when home appliance 2 is moved, it is possible to prevent outlet plug 700 from being mistakenly moved along home appliance 2, and to reduce the cost.

The position information stored in position information storages 711, 721, and 731 does not necessarily have to match the room numbers assigned by control terminal 805. Home appliances 2 in each room can be controlled by associating position information storages 711, 721, and 731 of outlet plugs 700 with the room numbers assigned by control terminal 805.

INDUSTRIAL APPLICABILITY

The present disclosure is useful in a home appliance management system, an outlet plug, a home appliance, and a control terminal which are capable of eliminating the need for input of the position information into an input unit each time a home appliance is added or is replaced with another home appliance, by controlling the linked operations of home appliances.

REFERENCE MARKS IN THE DRAWINGS 1, 10 home appliance management system
2 home appliance
3 connection cord
4, 700 outlet plug
5, 805 control terminal
6 indoor space
7 outlet
21, 621 air purifier
211 suction port
212 discharge port
22, 622 humidifier
221 jet port
23, 623 ventilation fan
251, 261, 271 position information receiving unit
252, 262, 272, 652, 662, 672 function providing unit
253, 263, 273, 653, 663, 673 type information storage
254, 264, 274 position and type information transmitting unit
30 indoor network
411, 421, 431 position information storage
412, 422, 432 position information transmitting unit
51, 851 position and type information receiving unit
52, 852 position and type information storage
53, 853 operating condition determining unit
54, 854 operation controller
55, 855 state information receiving unit
654, 664, 674 type information transmitting unit
655, 665, 675 state information transmitting unit
711, 721, 731 position information storage 712, 722, 732 type information receiving unit
713, 723, 733 position and type information transmitting unit
714, 724, 734 device operation controller
715, 725, 735 state information transmitting and receiving unit

The invention claimed is:

1. A home appliance management system comprising:
an outlet plug which has an IN terminal and an OUT terminal, the outlet plug receiving power supply by the IN terminal being connected to an outlet, the outlet plug supplying power via the OUT terminal;
a home appliance which receives power supply from the outlet plug, the home appliance including a first home appliance and a second home appliance; and
a control terminal which controls the first home appliance and the second home appliance,
wherein the outlet plug includes:
 a position information storage which stores position information which is information for identifying a position of the outlet plug; and
 a position information transmitting unit which transmits, via a connection cord, the position information stored in the position information storage to the home appliance connected to the OUT terminal,
the home appliance includes:
 a position information receiving unit which receives the position information from the outlet plug via the connection cord, the position information having been transmitted from the outlet plug;
 a function providing unit which provides a predetermined function, receives an operating condition transmitted from the control terminal, and executes the received operating condition;
 a type information storage which stores type information which indicates a type of the predetermined function provided by the function providing unit; and
 a position and type information transmitting unit which transmits the position information and the type information to the control terminal, and
the control terminal includes:
 a position and type information receiving unit which receives the position information and the type information from the first home appliance and the second home appliance;
 a position and type information storage which stores the position information in association with the type information, the position information and the type information having been received by the position and type information receiving unit;
 an operating condition determining unit which determines a first operating condition for the first home appliance, based on the position information and the type information stored in the position and type information storage; and
 an operation controller which transmits the first operating condition determined by the operating condition determining unit to the first home appliance,
wherein the control terminal includes a state information receiving unit which receives, from the home appliance, state information which indicates a state of a room in which the home appliance is placed,
the operating condition determining unit determines a second operating condition for the second home appliance having position information identical to the position information for the first home appliance, based on the state information received by the state information receiving unit, the position information of the first home appliance, and the position information and the type information stored in the position information storage, and
the operation controller transmits the second operating condition determined by the operating condition determining unit to a corresponding home appliance having identical position information as the first home appliance.

2. The home appliance management system according to claim 1,
wherein the operating condition determining unit extracts an electric appliance from the position and type information storage based on the home appliance which has transmitted the state information, the electric appliance having position information identical to position information associated with the home appliance which has transmitted the state information, and
the operating condition determining unit determines, for the extracted electric appliance, an operating condition for causing the extracted electric appliance to perform an operation for improving the state information.

3. An outlet plug corresponding to a home appliance management system, the home appliance management system comprising the outlet plug, a home appliance which receives power supply from the outlet plug and a control terminal which controls the home appliance, the outlet plug having an IN terminal and an OUT terminal, the outlet plug receiving power supply by the IN terminal being connected to an outlet, the outlet plug supplying power to a home appliance via the OUT terminal, the outlet plug comprising:
a position information storage which stores position information which is information for identifying a position of the outlet plug; and
a position information transmitting unit which transmits, via a connection cord, the position information stored in the position information storage to the home appliance connected to the OUT terminal;
the home appliance includes:
 a first home appliance and a second home appliance;
 a position information receiving unit which receives the position information from the outlet plug via the connection cord, the position information having been transmitted from the outlet plug;
 a function providing unit which provides a predetermined function, receives an operating condition transmitted from the control terminal, and executes the received operating condition;
 a type information storage which stores type information which indicates a type of the predetermined function provided by the function providing unit; and
 a position and type information unit which transmits the position information and type information to the control terminal, and
the control terminal includes:
 a position and type information receiving unit which receives the position information and the type information from the first home appliance and the second home appliance;
 a state information receiving unit which receives, from the first home appliance, state information which indicates a state of a room in which the first home appliance is placed;
 a position and type information storage which stores the position information in association with the type information, the position information and the type information having been received by the position and type information receiving unit;

an operating condition determining unit which determines a first operating condition for the first home appliance, based on the position information and the type information stored in the position and type information storage; and an operation controller which transmits the first operating condition determined by the operating condition determining unit to the first home appliance, wherein the operating condition determining unit determines a second operating condition for the second home appliance having position information identical to the position information for the first home appliance, based on the state information received by the state information receiving unit, the position information of the first home appliance, and the position information and the type information stored in the position information storage, and the operation controller transmits the second operating condition determined by the operating condition determining unit to a corresponding home appliance having identical position information as the first home appliance.

4. A home appliance comprising:

a function providing unit which provides a predetermined function;

a type information storage which stores type information which indicates a type of the predetermined function provided by the function providing unit;

a position information receiving unit which receives, from an outlet plug which is connected via a connection cord, position information via the connection cord, the position information being stored in the outlet plug; and a position and type information transmitting unit which transmits the position information received by the position information receiving unit, the type information stored in the type information storage and state information which indicates a state of a room in which the home appliance is placed to a control terminal, wherein the function providing unit receives an operating condition transmitted from the control terminal, and executes the received operating condition, the home appliance includes a first home appliance and a second home appliance, the control terminal includes:

a position and type information receiving unit which receives the position information and the type information from the first home appliance and the second home appliance;

a state information receiving unit which receives, from the first home appliance, state information which indicates a state of a room in which the first home appliance is placed;

a position and type information storage which stores the position information in association with the type information, the position information and the type information having been received by the position and type information receiving unit;

an operation condition determination unit which determines a first operating condition for the first home appliance, based on the position information and the type information stored in the position and type information storage; and an operation controller which transmits the first operating condition determined by the operating condition determining unit to the home appliance, wherein the operating condition determining unit determines a second operating condition for the home appliance having position information identical to the position information for the first home appliance, based on the state information received by the state information receiving unit, the position information of the first home appliance, and the position information and the type information stored in the position information storage, and the operation controller transmits the second operating condition determined by the operating condition determining unit to a corresponding home appliance having identical position information as the first home appliance.

5. A control terminal comprising:

a position and type information receiving unit which receives position information and type information, the position information being information for identifying a position of a home appliance, the type information indicating a type of a function provided by the home appliance, the home appliance including a first home appliance and a second home appliance;

a state information receiving unit which receives, from the first home appliance, state information which indicates a state of a room in which the first home appliance is placed;

a position and type information storage which stores the position information in association with the type information, the position information and the type information having been received by the position and type information receiving unit;

an operating condition determining unit which determines a first operating condition for the first home appliance based on the position information and the type information stored in the position and type information storage; and an operation controller which transmits the first operating condition determined by the operating condition determining unit to the first home appliance, wherein the operation condition determining unit determines a second operating condition for the second home appliance having position information identical to the position information for the first home appliance, based on the state information received by the state information receiving unit, the position information of the first home appliance, and the position information and the type information stored in the position information storage, and the operation controller transmits the second operating condition determined by the operating condition determining unit to a corresponding home appliance having identical position information as the first home appliance.

6. A home appliance management system comprising:

an outlet plug having an IN terminal and an OUT terminal, the outlet plug receiving power supply by the IN terminal being connected to an outlet, the outlet plug supplying power via the OUT terminal the outlet plug including a first outlet plug and a second outlet plug;

a home appliance which receives power supply from the outlet plug; and a control terminal which controls the home appliance, wherein the home appliance includes:
a function providing unit which provides a predetermined function, receives an operating condition from the outlet plug via a connection cord, and executes the received operating condition;
a type information storage which stores type information which indicates a type of the predetermined function provided by the function providing unit; and
a type information transmitting unit which transmits the type information to the outlet plug via the connection cord, and the outlet plug includes:
a position information storage which stores position information which is information for identifying a position of the outlet plug;
a type information receiving unit which receives the type information via the connection cord from the type information transmitting unit in the home appliance;
a position and type information transmitting unit which transmits the position information and the type information to the control terminal; and
a device operation controller which receives the operating condition from the control terminal and transmits the operating condition to the function providing unit in the home appliance, the control terminal includes:
a position and type information receiving unit which receives the position information and the type information from the first outlet plug and the second outlet plug;
a state information receiving unit which receives, from the first outlet plug, state information which indicates a state of a room in which the first outlet plug is placed;
a position and type information storage which stores the position information in association with the type information, the position information and the type information having been received by the position and type information receiving unit;
an operating condition determining unit which determines a first operating condition for the home appliance which receives power supply from the first outlet plug based on the position information and the type information stored in the position and type information storage; and
an operation controller which transmits the first operating condition determined by the first operating condition determining unit to the outlet plug, wherein the operating condition determining unit determines a second operating condition for the second outlet plug having position information identical to the position information for the first outlet plug, based on the state information received by the state information receiving unit, the position information of the first outlet plug, the position information and the type information stored in the position information storage, and
the operation controller transmits the second operating condition determined by the operating condition determining unit to an outlet plug connected to a corresponding home appliance.

7. The home appliance management system according to claim 6,
wherein the operating condition determining unit extracts an outlet plug identical to position information associated with the outlet plug which has transmitted the state information, from the position and type information storage based on the outlet plug which has transmitted the state information.

8. The home appliance management system according to claim 7,
wherein the operating condition determining unit determines, according to a combination of a plurality of the home appliances connected to the extracted outlet plug, an operation of each of the plurality of the home appliances, the operation being for improving the state indicated by the state information.

9. An outlet plug corresponding to a home appliance management system, the home appliance management system comprising the outlet plug, a home appliance which receives power supply from the outlet plug and a control terminal which controls the home appliance, the outlet plug having an IN terminal and an OUT terminal, the outlet plug receiving power supply by the IN terminal being connected to an outlet, the outlet plug supplying power to a home appliance via the OUT terminal, the outlet plug comprising:
a position information storage which stores position information which is information for identifying a position of the outlet plug;
a type information receiving unit which receives type information via a connection cord from the home appliance, the type information indicating a type of a function provided by a function providing unit in the home appliance;
a position and type information transmitting unit which transmits the type information and the position information to a control terminal; and
a device operation controller which receives an operating condition from the control terminal and transmits the received operating condition to the function providing unit in the home appliance;

the home appliance includes:
first home appliance and a second home appliance;
a position information receiving unit which receives the position information from the outlet plug via the connection cord, the position information having been transmitted from the outlet plug;
a function providing unit which provides a predetermined function, receives an operating condition transmitted from the control terminal, and executes the received operating condition;
a type information storage which stores type information which indicates a type of the predetermined function provided by the function providing unit; and
a position and type information unit which transmits the position information and type information to the control terminal, and the control terminal includes:
a position and type information receiving unit which receives the position information and the type information from the first home appliance and the second home appliance;
a state information receiving unit which receives, from the first home appliance, state information which indicates a state of a room in which the first home appliance is placed;
a position and type information storage which stores the position information in association with the type information, the position information and the type information having been received by the position and type information receiving unit;

an operating condition determining unit which determines a first operating condition for the first home appliance, based on the position information and the type information stored in the position and type information storage; and an operation controller which transmits the first operating condition determined by the operating condition determining unit to the first home appliance, wherein the operating condition determining unit determines a second operating condition for the second home appliance having position information identical to the position information for the first home appliance, based on the state information received by the state information receiving unit, the position information of the first home appliance, and the position information and the type information stored in the position information storage, and the operation controller transmits the second operating condition determined by the operating condition determining unit to a corresponding home appliance having identical position information as the first home appliance.

10. A home appliance comprising:

a function providing unit which provides a predetermined function, receives an operating condition via a connection cord from an outlet plug, and executes the received operating condition;

a type information storage which stores type information which indicates a type of the predetermined function provided by the function providing unit; and a type information transmitting unit which transmits the type information to the outlet plug via the connection cord;

wherein the function providing unit receives an operating condition transmitted from a control terminal, and executes the received operating condition, the home appliance includes a first home appliance and a second home appliance, the control terminal includes:

a position and type information receiving unit which receives position information and type information from the first home appliance and the second home appliance;

a state information receiving unit which receives, from the first home appliance, state information which indicates a state of a room in which the first home appliance is placed;

a position and type information storage which stores the position information in association with the type information, the position information and the type information having been received by the position and type information receiving unit;

an operation condition determination unit which determines a first operating condition for the first home appliance, based on the position information and the type information stored in the position and type information storage; and an operation controller which transmits the first operating condition determined by the operating condition determining unit to the home appliance, wherein the operating condition determining unit determines a second operating condition for the home appliance having position information identical to the position information for the first home appliance, based on the state information received by the state information receiving unit, the position information of the first home appliance, and the position information and the type information stored in the position information storage, and the operation controller transmits the second operating condition determined by the operating condition determining unit to a corresponding home appliance having identical position information as the first home appliance.

11. A control terminal comprising:

a position and type information receiving unit which receives position information and type information from an outlet plug, the position information being information for identifying a position of the outlet plug, the type information indicating a type of a function provided by a function providing unit in a home appliance, the home appliance including a first home appliance and a second home appliance;

a state information receiving unit which receives, from the first home appliance, state information which indicates a state of a room in which the first home appliance is placed;

a position and type information storage which stores the position information in association with the type information, the position information and the type information having been received by the position and type information receiving unit;

an operating condition determining unit which determines a first operating condition for the first home appliance based on the position information and the type information stored in the position and type information storage; and an operation controller which transmits the first operating condition determined by the operating condition determining unit to an outlet plug connected to the first home appliance, wherein the operation condition determining unit determines a second operating condition for the second home appliance having position information identical to the position information for the first home appliance, based on the state information received by the state information receiving unit, the position information of the first home appliance, and the position information and the type information stored in the position information storage, and the operation controller transmits the second operating condition determined by the operating condition determining unit to a corresponding home appliance having identical position information as the first home appliance.

* * * * *